Oct. 18, 1966     M. PLOKE     3,279,317
OPTICAL FILTER DEVICE WITH TWO SERIES OF INTERFERENCE LAYERS
FOR TRANSMITTING VISIBLE LIGHT AND
REFLECTING HEAT RADIATION

Filed June 25, 1962                                        3 Sheets-Sheet 1

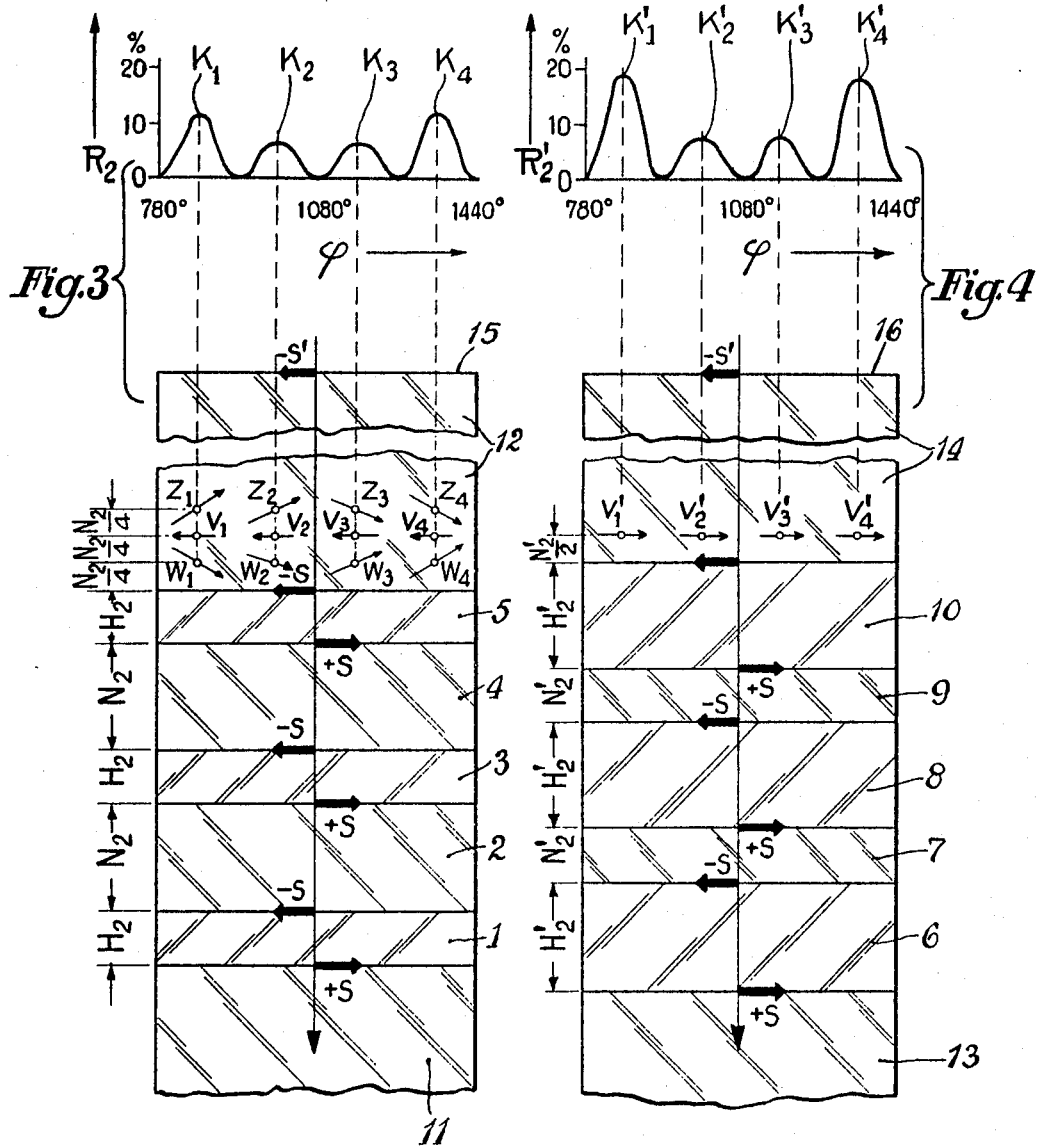

Oct. 18, 1966   M. PLOKE   3,279,317
OPTICAL FILTER DEVICE WITH TWO SERIES OF INTERFERENCE LAYERS
FOR TRANSMITTING VISIBLE LIGHT AND
REFLECTING HEAT RADIATION
Filed June 25, 1962   3 Sheets-Sheet 3

3,279,317
OPTICAL FILTER DEVICE WITH TWO SERIES OF INTERFERENCE LAYERS FOR TRANSMITTING VISIBLE LIGHT AND REFLECTING HEAT RADIATION
Martin Ploke, Kiel, Germany, assignor to Zeiss Ikon Aktiengesellschaft, Stuttgart, Germany
Filed June 25, 1962, Ser. No. 204,671
Claims priority, application Germany, June 30, 1961, Z 8,836
4 Claims. (Cl. 88—106)

This invention relates to the separation of heat radiation from the beam emitted by a source of light by means of multiple interference layers.

It is known that with a coating disposed on an optical part and consisting of several superposed thin layers of absorption-free substances of alternately high and low refractive indices a loss free beam splitting is possible, which means that incident light may be separated into transit light and reflected light without noticeable intrinsic heating of the coated optical part. Dependent upon whether the light at the border areas of the partial layers of the coating is reflected in phase or in phase opposition, such a coating acts either as a reflector or simply as a layer of high transmissivity which, when specially tempered, is even able to reduce the reflection of a glass plate.

For eliminating the heat radiated from the light rays of a source of light, there is commonly used on one hand a so-called cold light reflector consisting of a light transmitting mirror coated with an absorption-free interference layer, and on the other hand a heat reflection filter with one or two interference layers and having a heat reflection range of 0.75 to 1.4$\mu$. These known devices, however, are not entirely satisfactory. A light source of a low color temperature, as for instance a projection incandescent lamp of 3000° K., reaches only at 1.4$\mu$ of the minimum wavelength of the double layer filter the maximum of the radiation emission. To employ cold light reflectors for eliminating the heat from the ray paths particularly of incandescent lamps is frequently not possible for lack of space because of the compact structure of the condensers used. But also in connection with mirror condensers and high temperature light sources, as for instance Xenon lamps, a heat reflection filter may advantageously be employed either as a means to suppress infrared secondary bands of a cold light reflector, or as a low cost heat filter in connection with ordinary mirrors. For all these reasons there is a technical need for an improved efficiently working heat reflection filter.

It is an object of the invention to extend the effective range of a heat reflection filter toward longer waves and to further narrow the gap which is present up to the minimum wavelength of glass absorption at approximately 2.5$\mu$ in the effective radius of heat reflection filters.

This problem is solved according to the invention in that two multiple interference layers $S_1$ and $S_2$ are arranged in the beam emitted by a light source, of which $S_2$ in the infrared range has two primary reflection maxima while $S_1$ in known manner has only one primary reflection maximum which is positioned spectrally between the two primary reflection maxima of $S_2$. By means of a dimensioning formula for the individual layers of the interference coatings, which formula will be specified below, it is made possible that a colorless transparent glass carrier having been provided with outer coatings of $S_1$ and $S_2$ maintains the property of transmitting the visible spectrum practically colorless and at the same time retains a light transmissivity which is equal to the uncoated glass carrier or superior to it. If a heat reflection filter according to the invention is positioned in the beam emitted by a source of light, the light impinges successively on two reflecting surfaces which in the infrared range have three juxtaposed reflection bands. It is obvious that in this manner there is reflected a larger portion of the infrared radiation than with heat reflecting filters of the prior art.

The above described high transparency of a filter according to the invention is achieved under the condition that in the multiple interference layer $S_2$ the primary reflection maximum of the fourth degree lies within the ultraviolet range, while the maximum of the third degree lying in the visible region is suppressed. The interference layer $S_1$ in known manner is to be so dimensioned that the primary reflection maximum of the third degree lies within the ultraviolet range, while the maximum of the second degree lying in the visible region is suppressed. This effect will be brought about when in the interference layer $S_2$, aside from the top and base layers, the high and low refractive layers H and N, respectively, each have the same optical thickness H and N, respectively, and the proportion of the layer thickness is $H:N=1:2$, or $H:N=2:1$. In the layer $S_1$, however, H and N are equal. In order to eliminate disturbing secondary bands of the adjacent primary reflection bands, which lie within the passage region, each multiple intereference layer is provided with a low refractive coating the optical thickness of which for $H:N=1:2$ is about $N/4$, for $H:N=2:1$ about $3N/4$, and for $H:N=1:1$ about $N/2$.

It has been proposed heretofore to place three primary reflection maxima of a multiple interference layer in the infrared range, while two other primary reflection maxima present in the visible region were to be suppressed by means of tempered multiple layers. This known coating, however, has the disadvantage that in contrast to the coating of the present invention there remain between the primary reflection maxima disposed in the infrared range wide spectral areas of a high degree of transmissivity and it is neither evident nor suggested in what manner these gaps are to be closed. Moreover, such a coating would have to be substantially thicker than for instance the $S_2$-coating according to the invention whereby the durability of the coating would be jeopardized. Finally, this heretofore proposed coating imposes special refractive requirements on its partial layers which are difficult to comply with. For all these reasons this previously proposed coating has met little acceptance.

As to the special composition of the coating it may be mentioned that there is known a multiple interference layer consisting of partial layers of equal optical thickness which is similar to the layer $S_1$ of the present invention and which has been used for the purpose of heat reflection. Known per se are also filter coatings consisting of high and low refractive partial layers of equal optical thickness H and N, respectively, and having a layer ratio of $H:N=1:2$, and $H:N=2:1$. It is also known to employ filter layers with high and low refractive partial layers H and N respectively, and to employ a layer ratio $H:N=1:2$ or $H:N=2:1$, respectively, when H designates the optical thickness of the uniformly thick high refractive partial layers and N designates the optical thickness of the uniformly thick low refractive partial layers. These layers, however, were found suitable only for color filters, for instance purple filters. Particularly, the thickness of the partial layers was not dimensioned as suggested for the $S_2$ layer of the present invention, namely that the primary reflecting bands of the first and second degree are positioned in the infrared range and the band of the third degre is positioned in the ultraviolet range, while the band of the second degree lying within the visible region is suppressed. A further disadvantage of these known multiple interference layers having a ratio of $H:N=1:2$, and $H:N=2:1$, respectively, is that as yet no smoothing layers of a simple composition are known for eliminating secondary bands of the primary reflection bands.

According to the method of the invention the combination of two multiple interference layers $S_1$ and $S_2$ makes it possible to produce a partically colorless heat reflection filter which possesses in the infrared region three closely joining primary reflection bands.

The composition and the effect of the multiple interference layer according to the invention will now be described in detail with reference to the accompanying drawings, in which:

FIG. 3 and FIG. 4 illustrate each diagrammatically the arrangement of smoothing layers and in their upper portion the resulting reflection diagrams;

Figure 1A:
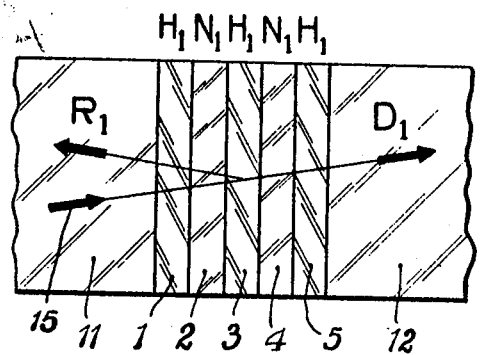
FIG. 1a illustrates diagrammatically a number of interference layers of variable thicknesses arranged between layers having low refractive indices.
Figure 1B:
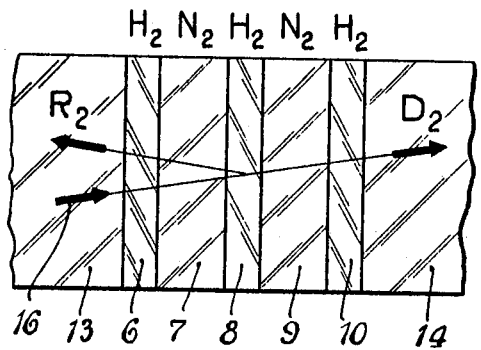
FIG. 1b illustrates diagrammatically a number of interference layers of variable thickness arranged between layers having low refractive indices.

The FIGS. 1a and 1b illustrate schematically two multiple interference layers of the type $S_1$ and $S_2$, each consisting of five partial layers 1 to 5 and 6 to 10, but without additional smoothing layers for the elimination of disturbing secondary bands. For an easier calculation it has been assumed that to both sides of these layers there are arranged low refractive media 11, 12, and 13, 14 for instance glass. The arrows 15, 16 designate incident light which is split in reflected and transmitted light according to the reflecting power $R_1$, $R_2$ and the degree of transmissivity $D_1$ and $D_2$ of the individual layers. Because of the loss-free beam spliting, the following equation applies:

$$R+D=1 \quad (1)$$

In the layer $S_1$ illustrated in FIG. 1a the high refractive partial layers, 1, 3, 5 and the low refractive partial layers 2, 4, 6 have the same optical thickness $$N_1 = H_1 = 0.263\mu \quad (2)$$

whereas the layer $S_2$ illustrated in FIG. 1b has the optical thickness of $$H_2 = 0.263\mu \quad (3)$$

for the high refractive layers 6, 8, 10, and the optical thickness $$N_2 = 2 \times 0.263\mu = 0.526\mu \quad (4)$$

for the low refractive layers 7 and 9. For the theoretical computation according to known formulas it has further been assumed that the high refractive layers consist of a material having the index of refraction 2.30, and that the low refractive layers as well as the media 11, 12, 13 and 14 consist of a material having the index of refraction 1.38.

Figure 2:
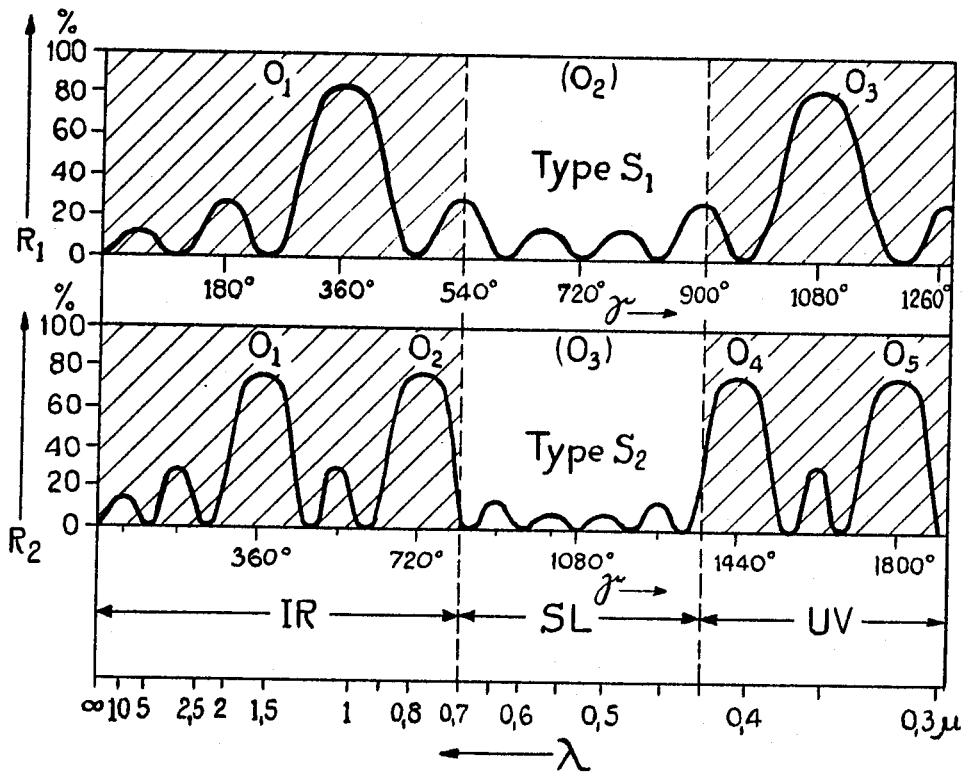
FIG. 2 illustrates graphs showing the reflection curves of the two types of interference layers illustrated in the FIGS. 1a and 1b.

As the theory of the thin layers shows, the reflecting power in regularly composed layer systems is in conformity with physical principles particularly when as an independent variable is selected the phase retardation expressible in angle degrees to which the light is subjected according to its wavelength within the layer system. FIG. 2 shows therefore as independent variable the phase angle $\gamma$ pertaining to a pair of layers $H_1$, $N_1$, or $H_2$, $N_2$, respectively. For transformation into the more common wavelength scale, which is likewise indicated in FIG. 2, may serve the known equation $$\gamma = 180° \frac{H+N}{\lambda/4} = 720° \frac{H+N}{\lambda} \quad (5)$$

wherein H and N, respectively, stand for the value of the Equation 2 in the layer $S_1$, and for the values of the Equations 3 and 4, respectively, in the layer $S_2$.

The wavelength scale thus determined is unequally graduated. The wavelength ranges ultraviolet, visible radiation and infrared are designated by the letters UV, SL and IR, respectively. The computed reflection curves demonstrate the principle of the invention. In the phase angle distance of 360° there appear regularly primary reflection maxima $O_1$, $O_2$ and $O_3$, of which some are suppressed owing to the symmetrical layer composition. The multiple interference layer $S_1$, known per se and consisting of several partial layers of equal optical thickness, furnishes for instance a reflection curve $R_1$ having the following properties: A primary reflection maximum of the first degree $O_1$ in the infrared range, the maximum of the second degree $O_2$ lying in the visible region is suppressed, and only in the ultraviolet range will then appear more primary reflection maxima $O_3$, etc. The layer $S_2$ furnishes a reflecting power $R_2$ with two primary reflection maxima $O_1$ and $O_2$ in the infrared region, the maximum $O_3$ in the visible region is suppressed, and the ultraviolet region has two more primary reflection maxima $O_4$ and $O_5$ following each other.

In the dimensional specification according to the Equations 2 to 4 the two layer systems have the inventive property that the primary reflection maximum of the first degree of the layer $S_1$ according to the curve for $R_1$ is positioned between the two primary reflection maxima of the first and second degree of the layer $S_2$ corresponding to the curve for $R_2$, so that with the layers $S_1$ and $S_2$ being arranged in series these three reflection maxima form together a virtually continuous infrared reflection spectrum of great spectral width. Thus, aside from smaller secondary maxima which may be suppressed as will be described below, a high light transmissivity in the visible region is assured as well as the width of the transmitting range in the visible region is large enough for practical purposes.

The FIGS. 3 and 4 illustrate the suggested smoothing layer and show the layer scheme of two systems of the $S_2$-type having three high refractive layers 1, 3, 5 and 6, 8, 10, respectively, two low refractive layers 2, 4 and 7, 9, respectively, and low refractive outer media 11, 12 and 13, 14, respectively, of which the media 12 and 14 each have a border surface 15 and 16, respectively, touched by air. The upper portion of these FIGS. 3 and 4 shows also the reflection diagram which illustrates, as in FIG. 2, the dependency of the reflecting power $R_2$ or $R'_2$, respectively, in the regions of the secondary bands, which fall into the transmission range located in the visible region, from the phase angle $\gamma$. The FIGS. 3 and 4 differ from one another by the ratio of the optical thicknesses of the high refractive layers $H_2$ and $H'_2$, respectively, to the low refractive layers $N_2$ and $N'_2$, respectively, whereby FIG. 3 refers to the layer proportion $$H_2 : N_2 = 1 : 2 \quad (6)$$

while FIG. 4 illustrates the complementary type $$H'_2 : N'_2 = 2 : 1 \quad (7)$$

As known, the resulting reflecting power of the layer systems is obtained by adding the reflection vectors, which are effective at the border surfaces of the partial layers having the refractive index $n_H$ and $n_N$, respectively, to the amount of the Fresnel coefficient $$s = \frac{n_H - n_N}{n_H + n_N} \quad (8)$$

under consideration of the multiple reflections and the phase difference between the point of incidence and the border surfaces, and subsequent squaring of the amount. As shown, the resulting curves have identical characteristics. In each layer system there appear four secondary bands having the maxima $K_1$, $K_2$, $K_3$, $K_4$ and $K'_1$, $K'_2$, $K'_3$, $K'_4$, respectively, which differ from each other.

The reflection vectors $V_1$, $V_2$, $V_3$, $V_4$ of FIG. 3, and $V'_1$, $V'_2$, $V'_3$, $V'_4$ of FIG. 4 pertaining to the mentioned secondary maxima show the following characteristics within the low refractive final layer: At a distance from the last high refractive layer 5 or 10, respectively, corresponding to one half optical thickness $N/2$ or $N'2$, respectively, of the low refractive partial layers 2 or 4, and 7 or 9, respectively, the phase angle of the vectors $V_1$, $V_2$, $V_3$, $V_4$ is 180°, and the phase angle of the vectors $V'_1$, $V'_2$, $V'_3$, $V'_4$ is 360° or 0°, respectively.

The border surfaces 15, 16 of the low refracting outer layers 12 and 14, respectively, touched by air, on the other hand cause the appearance of an additional reflection vector in the amount of $$S' = \frac{n_N - 1}{n_N + 1} \tag{9}$$

which is equidirectional with the vectors $V_1$, $V_2$, but opposed to the vectors $V'_1$, $V'_2$. Its size is sufficient to compensate the vectors $V'_1$, $V'_2$. For this purpose the invention provides for a shifting of the border surface 16 into the plane of the vectors $V'_1$, $V'_2$, which means that in the layer system illustrated in FIG. 4 the secondary bands $K'_1$, $K'_2$, etc. are brought to disappearance to a sufficient extent when the low refractive outer surface has one half of the optical thickness of the low refractive partial layer or one quarter of the optical thickness of the high refractive partial layers. The complementary layer system according to FIG. 3 requires, however, a different dimensioning because the vectors $V_1$, $V_2$, etc. are equidirectional to the vector—$s$. Since the phase angle of the resulting reflection vector changes when the distance from the last border surface is changed, the vector will be in the positions $W_1$, $W_2$, etc., and $Z_1$, $Z_2$, etc. respectively, which are favorable for the compensation when the low refractive outer surface has been given an optical thickness of about one quarter or three quarters, respectively, of the low refractive partial layers. The result shows that low refractive coating layers having an approximate optical thickness of $N/4$ or $3N/4$, respectively, are qualified for smoothing the secondary bands in the system with the layer ratio $H:N = 1:2$. For the system having the layer ratio $H:N = 2:1$, however, coating layers of the optical thickness $N/2$ are favorable. Obviously, also other coating layers, such as known customary tempered layers, may be considered for this purpose, but the smoothing layers according to the invention distinguish themselves by their great simplicity.

It is also within the scope of the invention to include the two layer systems which are arranged to both sides of the basic systems consisting of the partial layers 1 to 5, and 6 to 8, respectively, in tempered outer layer systems which compensate the reflection vectors of the basic systems in the range of the secondary bands lying within the visible region.

Figure 5:
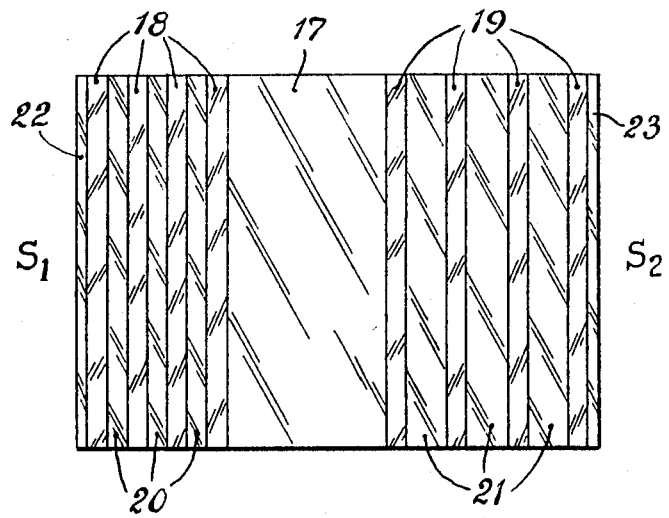
FIG. 5 illustrates in a side elevation view a heat reflection filter constructed in accordance with the present invention.

The foregoing disclosure may also be applied to systems employing a larger number of layers. FIG. 5 for instance shows such a heat reflection filter in accordance with the invention in which the carrier of the multiple interference layers $S_1$ and $S_2$ consists of a plane plate 17 made of heat resistant absorption free glass having polished outer surfaces. The two layer systems consist each of four high refractive layers 18 and 19, respectively, three low refractive layers 20 and 21, respectively, and a low refractive coating 22 or 23, respectively. The optical thicknesses of the layers 18 and 20 of the coating $S_1$ are equal, while for the optical thickness of the layers 19 and 21 the ratio 1:2 has been selected. The coating 22 has half the optical thickness of the low refractive layers 20, and the coating 23 has one fourth the optical thickness of the low refractive layers 21. Therefore, the two layer systems illustrated in FIG. 5 differ from the systems illustrated in the FIGS. 1$a$ and 1$b$ merely by the addition of another layer pair and of the coatings 22 and 23, respectively.

Figure 6:
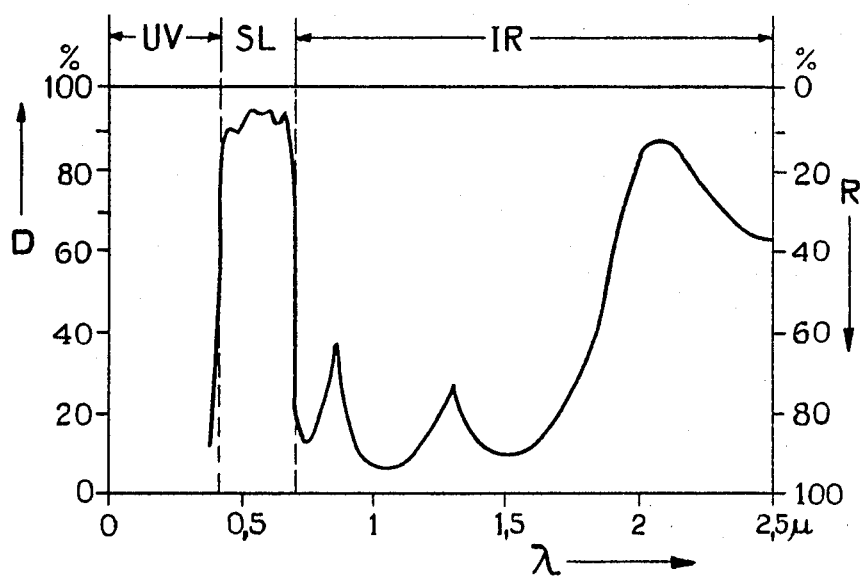
FIG. 6 illustrates the filter transmission characteristic of the heat reflection filter shown in FIG. 5.

The filter transmission characteristic illustrated in FIG. 6 was measured on a test filter of the construction disclosed in FIG. 5. The wavelength scale again indicates the three spectral regions ultraviolet (UV), visible light (SL) and infrared (IR). The course of the characteristic shows that the disclosed heat reflection filter possesses in the visible light region a light transmissivity of more than 90% and that the infrared range shows a continuous reflection band which extends over the wavelength range of $0.7\mu$ to $1.9\mu$. A smaller secondary reflection band is noticeable toward the longer waves. The three successive primary reflection maxima impart a slight undulation to the reflection band without imparing the filtering function in any way. The filter of the invention is of good use in all those cases where absorption filters can no longer be used because of the development of heat, while on the other hand also cold light mirrors are prohibitive because of their excessive dimension and construction and for economic reasons.

The use of the inventive method for separating the heat radiation from the beam emitted by a source of light is not limited to the embodiments illustrated in the foregoing description. In the scope of the invention is also included, for instance, the arrangement of the disclosed multiple interference layers to both sides, or alternately to one side or in any other succession, on any serially positioned optical parts, such as for example condenser lenses. Likewise within the scope of the invention lies the supplement of the effect of these layers by interference layers of a different type, or—as known—by preferably interposed colored or colorless absorption filters. Several filters of the type disclosed may be combined to one unit which for instance is uncoated at its outer surfaces. Filter of this construction have the advantage that the coating applied to the inner faces is protected against atmospheric influence and requires no maintenance or cleaning.

What I claim is:

1. In a device for reflecting the heat radiation from a beam of light, at least one optical member provided with at least two series of interference layers ($S_1$, $S_2$) in which the layers are composed of transparent materials of alternately high and low refractive indicies through which said beam of light passes successively, all of said partial layers having an optical thickness related to a reference wave length $\lambda$ of the transmission range of the filter in the visible range of the spectrum of approximately 0.526$\mu$m., one series of said interference layers ($S_2$) possesses within its infrared range two primary reflection maxima, while the other series of interference layers ($S_1$) has only one primary reflection maximum which spectrally is disposed between the two primary reflection maxima of said first mentioned series of interference layers, both series of interference layers are dimensioned such that in said other series of interference layers ($S_1$) the primary reflection maximum of second degree which lies in the visible range is suppressed, while the primary reflection maximum of third degree lies in the ultraviolet range and that in the first mentioned series of interference layers ($S_2$) the primary reflection maximum of third degree which lies in the visible range is suppressed, while the primary reflection maximum of fourth degree lies in the ultraviolet range, the high and low refractive layer having an optical thickness of $\lambda/2$ in the interference layers ($S_1$) while the high refractive layers in ($S_2$) have an optical thickness of $\lambda/2$ and the low refractive layers thereof have an optical thickness of $\lambda$, and cover layers for each one of said interference layers of low refractive material the optical thickness of which is substantially $\lambda/4$.

2. A device in accordance with claim 1, in which each one of said two series of interference layers consists of four layers of high refractive material and three layers of low refractive material.

3. A device in accordance with claim 1, in which said optical member comprises a transparent glass plate, on each one of the opposite plane faces of which is attached one of said series of interference layers.

4. A device in accordance with claim 1, in which said optical member comprises a transparent glass plate of heat resistant material, on each one of the opposite plane faces of which is attached one of said series of interference layers.

References Cited by the Examiner

UNITED STATES PATENTS

| | | |
|---|---|---|
| 2,412,496 | 12/1946 | Dimmick. |
| 2,624,238 | 1/1953 | Widdop et al. |
| 2,668,478 | 2/1954 | Schroder. |
| 2,742,819 | 4/1956 | Koch et al. _____ 88—106 X |

FOREIGN PATENTS

| | | |
|---|---|---|
| 211,597 | 11/1957 | Australia. |
| 550,365 | 12/1959 | Belgium. |
| 1,002,137 | 2/1957 | Germany. |
| 730,642 | 5/1955 | Great Britain. |
| 793,045 | 4/1958 | Great Britain. |

OTHER REFERENCES

Epstein: "Improvements in Heat-Reflecting Filters," article in "Journal of the Optical Society of America," vol. 45 No. 5, May 1955, pp. 360–362 cited.

DAVID H. RUBIN, *Primary Examiner.*